(12) United States Patent
Brooker et al.

(10) Patent No.: US 11,070,020 B2
(45) Date of Patent: Jul. 20, 2021

(54) SINUSOIDAL PHASE MODULATION OF MODE-LOCKED LASERS

(71) Applicant: Thorlabs, Inc., Newton, NJ (US)

(72) Inventors: Jeffrey S. Brooker, Centerville, VA (US); William Radtke, Ellicott City, MD (US); Hongzhou Ma, Centerville, VA (US); Eric Lieser, Boyce, VA (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 16/577,198

(22) Filed: Sep. 20, 2019

(65) Prior Publication Data

US 2020/0021078 A1 Jan. 16, 2020

Related U.S. Application Data

(63) Continuation-in-part of application No. 15/986,518, filed on May 22, 2018, now Pat. No. 10,615,564.

(60) Provisional application No. 62/510,072, filed on May 23, 2017.

(51) Int. Cl.
| | | |
|---|---|---|
| *H01S 3/10* | (2006.01) | |
| *H01S 3/11* | (2006.01) | |
| *H01S 3/115* | (2006.01) | |
| *H01S 3/08* | (2006.01) | |
| *H01S 3/00* | (2006.01) | |
| *G02B 27/10* | (2006.01) | |

(52) U.S. Cl.
CPC .......... *H01S 3/1106* (2013.01); *H01S 3/0085* (2013.01); *H01S 3/08054* (2013.01); *H01S 3/10046* (2013.01); *H01S 3/10061* (2013.01); *H01S 3/115* (2013.01); *G02B 27/10* (2013.01)

(58) Field of Classification Search
CPC ........................... H01S 3/0085; H01S 3/10046
See application file for complete search history.

(56) References Cited

U.S. PATENT DOCUMENTS

| | | | | |
|---|---|---|---|---|
| 4,225,873 A | * | 9/1980 | Winslow | G11B 7/0045 369/61 |
| 2004/0253000 A1 | | 12/2004 | Grifin | |
| 2006/0039419 A1 | * | 2/2006 | Deshi | H01C 17/242 372/9 |

(Continued)

FOREIGN PATENT DOCUMENTS

GB 2336938 A 11/1999

OTHER PUBLICATIONS

International search report and written opinion issued for corresponding International Patent Application No. PCT/US2018/033929, dated Oct. 25, 2018.

(Continued)

*Primary Examiner* — Michael Carter
(74) *Attorney, Agent, or Firm* — Myers Wolin, LLC

(57) ABSTRACT

An ultrafast mode-locked laser comprising circuitry configured to drive an electro-optic modulator (EOM) in the mode-locked laser with a drive waveform, the drive waveform being a phase-coherent sinusoidal waveform at a frequency equal to a repetition rate of the mode-locked laser, a phase-coherent pulsed waveform at a frequency equal to the repetition rate of the mode-locked laser, or a phase-coherent sinusoidal waveform at a frequency equal to half of the repetition rate of the mode-locked laser.

7 Claims, 7 Drawing Sheets

(56) References Cited

U.S. PATENT DOCUMENTS

| | | |
|---|---|---|
| 2008/0205884 A1* | 8/2008 | Maestle ............... H01S 5/0014 398/16 |
| 2009/0245301 A1 | 10/2009 | Peng et al. |
| 2010/0128744 A1* | 5/2010 | Deladurantaye .... H01S 3/06754 372/6 |
| 2014/0050235 A1 | 2/2014 | Clowes et al. |
| 2016/0359290 A1 | 12/2016 | Inaba et al. |
| 2018/0342847 A1 | 11/2018 | Brooker et al. |

OTHER PUBLICATIONS

Dallas et al., "Nd:YLF Laser for Airborne/Spaceborne Laser Ranging," Eighth International Workshop on Laser Ranging Instrumentation, NASA Goddard Space Flight Center; Greenbelt, MD, United States, Jun. 1, 1993, pp. 3-1 to 3-5.

Fujiwara et al., "Flattened optical multicarrier generation of 12.5 GHz spaced 256 channels based on sinusoidal amplitude and phase hybrid modulation," Electronics Letters, Jul. 19, 2001, pp. 967-968, vol. 37, Issue 15, Institution of Engineering and Technology.

International Search Report and written opinion issued by the International Searching Authority for corresponding International Patent Application No. PCT/US2019/052122, dated Nov. 28, 2019.

The extended European search report with written opinion issued by the European Patent Office for corresponding European Patent No. 19817108.4, dated Dec. 16, 2020.

\* cited by examiner

SINUSOIDAL PHASE MODULATION OF MODE-LOCKED LASERS

CROSS REFERENCE TO RELATED APPLICATIONS

This application is a continuation-in-part of U.S. patent application Ser. No. 15/986,518 filed on May 22, 2018, which claims the benefit of U.S. Provisional Patent Application No. 62/510,072 filed on May 23, 2017. The contents of U.S. patent application Ser. No. 15/980,518 and U.S. Provisional Patent Application No. 62/510,072 are hereby incorporated by reference.

FIELD OF THE INVENTION

The invention generally relates to laser modulation techniques. More particularly, the invention relates to a modulation of an ultrafast mode-locked laser using an electro-optic modulator (EOM) driven with a frequency and phase coherent AC waveform.

BACKGROUND

Mode-Locked Laser

Mode-locking is a technique in optics by which a laser can be made to produce pulses of light of extremely short duration, on the order of picoseconds ($10^{-12}$ s) or femtoseconds ($10^{-15}$ s).

The basis of the technique is to induce a fixed-phase relationship between the longitudinal modes of the laser's resonant cavity. The laser is then said to be "phase-locked" or 'mode-locked." Interference between these modes causes the laser light to be produced as a train of pulses. Depending on the properties of the laser, these pulses may be of extremely brief duration. For example, an ultrafast mode-locked laser is generally known as a laser that can generate pulses having a pulse duration less than a picosecond, and as short as a few femtoseconds. The train of pulses is commonly in the 50-100 MHz repetition rate range, and the duty cycle is lower than 0.01% or less.

Electro-Optic Modulator (EOM)

Electro-optic modulator (EOM) is an optical device in which a signal-controlled element exhibiting the electro-optic effect is used to modulate a beam of light. The modulation may be imposed on the phase, frequency, amplitude, or polarization of the beam.

The simplest kind of EOM consists of a crystal, such as lithium niobate, whose refractive index is a function of the strength of the local electric field. That means that if a lithium niobate crystal is exposed to an electric field, light will travel more slowly through it. But the phase of the light leaving the crystal is directly proportional to the length of time it takes for the light to pass through the crystal. Therefore, the phase of the laser light exiting an EOM can be controlled by changing the electric field applied to the crystal.

Combining this phase change with polarizers before and after the crystal, amplitude modulation can be achieved. When using an EOM as an amplitude modulator, the configuration is usually with two orthogonally aligned crystals. This helps reduce thermal drift. FIG. 1 shows an example setup of the EOM amplitude modulator.

The electro-optic amplitude modulator may be a Pockels cell type modulator consisting of two matched lithium niobate crystals 110, 120 packaged in a compact housing with an RF input connector. Applying an electric field to the crystal induces a change in the indices of refraction (both ordinary and extraordinary) giving rise to an electric field dependent birefringence which leads to a change in the polarization state of the optical beam. The Electro-optic crystal acts as a variable waveplate with retardance linearly dependent on the applied electric field. By placing a linear polarizer 140 at the exit, the beam intensity through the polarizer varies sinusoidally with linear change in applied voltage.

Electro-optic phase modulators provide a variable phase shift on a linearly polarized input beam. In one embodiment, the input beam is linearly polarized along the vertical direction which is the Z-axis of the crystal by a linear polarizer 130. A voltage at the RF input 150 is applied across the Z-axis electrodes 160 inducing a change in the crystal's extraordinary index of refraction thereby causing a phase shift in the optical signal.

DC Modulation

Two methods of DC control for amplitude modulation of mode-locked lasers are currently commonly used.

Existing techniques have achieved ~DC-1 MHz modulation control using a high voltage/high power DC coupled linear amplifier. This method allows control to any output intensity level over the course of 10 to 100 laser pulses. FIG. 2 shows a schematic diagram of a linear amplifier.

Several other EOM drive manufacturers use a push-pull arrangement to switch between two slowly varying DC levels. This method allows for switching between two output intensity levels over the course of 2 to 3 laser pulses. Changing those DC levels takes about 1,000 to 10,000 laser pulses. This approach is very effective in edge blanking of an image or other applications where an on-off feature is needed. FIG. 3 shows a schematic diagram of a push-pull amplifier.

AC Modulation

Modulating the amplitude of a mode-locked laser with an AC waveform is commonly done. It is usually accomplished by adding circuitry to create a resonant tank between the EOM crystal (purely capacitive element) and other passive components. This resonant system can then be controlled by a relatively low power AC signal generator. Phase locking this system to the train of pulses from the mode-locked laser allows the overlay of a signal on the output intensity of the train of pulses. As shown in FIG. 4, an AC waveform 410 is applied to the output pulses 420 of a mode-locked laser, resulting in a modulated amplitude output 430.

The modulation techniques discussed above have the drawback that it takes many pulses to change the output amplitude from one value to another desired value. However, there is a need to increase the speed of modulation. In particular, a pulse-by-pulse control of the laser power would provide improvements of and open up many new uses of ultrafast mode-locked lasers.

SUMMARY

An embodiment of the present invention is an extension of the AC modulation scheme already commonly in use. By using power RF techniques it is possible to modulate the phase or amplitude of the EOM drive very rapidly. Simulations suggest that there are multiple possible methods of using an AC EOM drive signal to perform amplitude modulation of the laser intensity in less than one laser pulse over the full range of the EOM contrast ratio. This allows pulse-by-pulse control of the laser power. Many applications requiring pulsed laser modulation would benefit from an increase in the speed of modulation over the current state of the art.

One embodiment of the invention provides an ultrafast mode-locked laser comprising circuitry configured to drive an electro-optic modulator (EOM) in the mode-locked laser with a drive waveform, the drive waveform being a phase-coherent sinusoidal waveform at a frequency equal to a repetition rate of the mode-locked laser.

Another embodiment of the invention provides an ultrafast mode-locked laser comprising circuitry configured to drive an electro-optic modulator (EOM) in the mode-locked laser with a drive waveform, the drive waveform being a phase-coherent pulsed waveform at a frequency equal to a repetition rate of the mode-locked laser.

Another embodiment of the invention provides an ultrafast mode-locked laser comprising circuitry configured to drive an electro-optic modulator (EOM) in the mode-locked laser with a drive waveform, the drive waveform being a phase-coherent sinusoidal waveform at a frequency equal to half of a repetition rate of the mode-locked laser.

Another embodiment of the invention provides an ultrafast mode-locked laser including: a mode-locked laser source configured to output laser pulses having a repetition rate; a synchronous electro-optic modulator (SEOM), including: a half wave plate; a first polarizing beam splitter or polarizer; an electro-optic modulator (EOM); circuitry configured to drive the SEOM with a drive waveform, the drive waveform being a phase-coherent sinusoidal waveform at a frequency equal to half of the repetition rate of the mode-locked laser source; and a second polarizing beam splitter; wherein the SEOM is arranged to direct the laser pulses from the laser source through the half wave plate, the first polarizing beam splitter, the EOM, and then to the second polarizing beam splitter; wherein the second polarizing beam splitter is configured to split the light pulses from the EOM into a first pulse train in a first direction having a first polarization state and a second pulse train in a second direction having a second polarization state.

Another embodiment of the invention provides an ultrafast mode-locked laser including: a mode-locked laser source configured to output a laser pulse train having a repetition rate; a first acousto-optic modulator (AOM); a second AOM; circuitry configured to drive the first AOM with a first drive waveform and to drive the second AOM with a second drive waveform, the first and second drive waveforms being phase-coherent sinusoidal waveforms at a frequency equal to half of the repetition rate of the mode-locked laser source, such that the first AOM diffracts odd pulses in the laser pulse train to a first direction and the second AOM diffracts even pulses in the laser pulse train to a second direction.

Another embodiment of the invention provides an ultrafast mode-locked laser source configured to output laser pulses having a repetition rate; $2^n-1$ synchronous electro-optic modulators (SEOMs) arranged into n stages, n being an integer; for k=1 to n, the $k^{th}$ stage comprises $2^{(k-1)}$ SEOMs, outputs of the SEOMs in the $k^{th}$ stage being fed to the SEOM of the $(k+1)^{th}$ stage, each of the SEOMs in the $k^{th}$ stage being driven with a phase-coherent sinusoidal waveform at a frequency equal to ½ the repetition rate of the pulse train entering into the stage; wherein each of the SEOM includes: a half wave plate; a first polarizing beam splitter or polarizer; an electro-optic modulator (EOM); circuitry configured to drive the SEOM with a drive waveform; and a second polarizing beam splitter; wherein the SEOM is arranged to direct laser pulses from an input of the SEOM through the half wave plate, the first polarizing beam splitter, the EOM, and then to the second polarizing beam splitter; wherein the second polarizing beam splitter is configured to split the light pulses from the EOM into a first output pulse train in a first direction having a first polarization state and a second output pulse train in a second direction having a second polarization state.

DETAILED DESCRIPTION OF THE PREFERRED EMBODIMENTS

Figure 1:
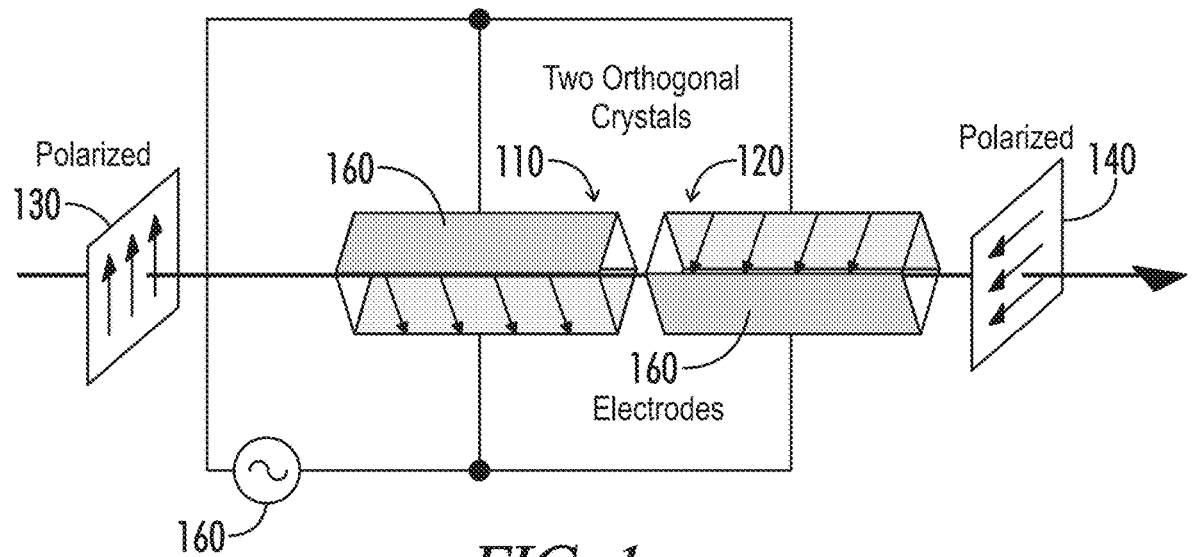
FIG. 1 shows a schematic diagram of an EOM Amplitude Modulator.
Figure 2:
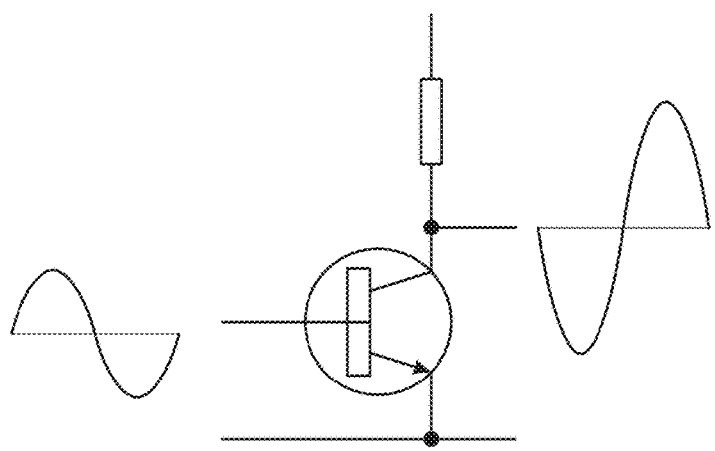
FIG. 2 shows a schematic diagram of a linear amplifier.
Figure 3:
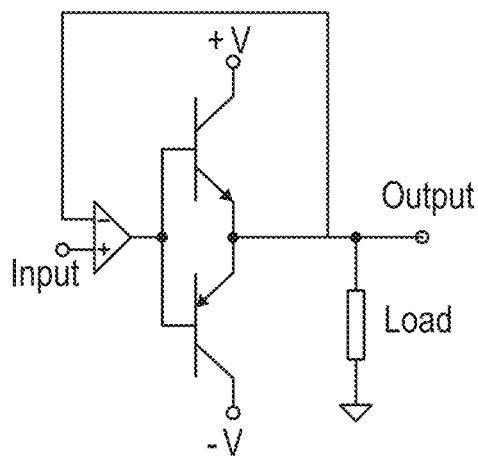
FIG. 3 shows a schematic diagram of a push-pull amplifier.
Figure 4:
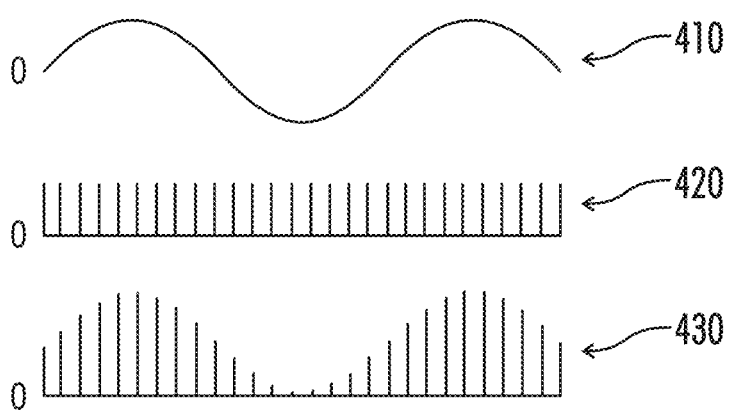
FIG. 4 illustrates an amplitude modulation with an AC waveform.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 5:
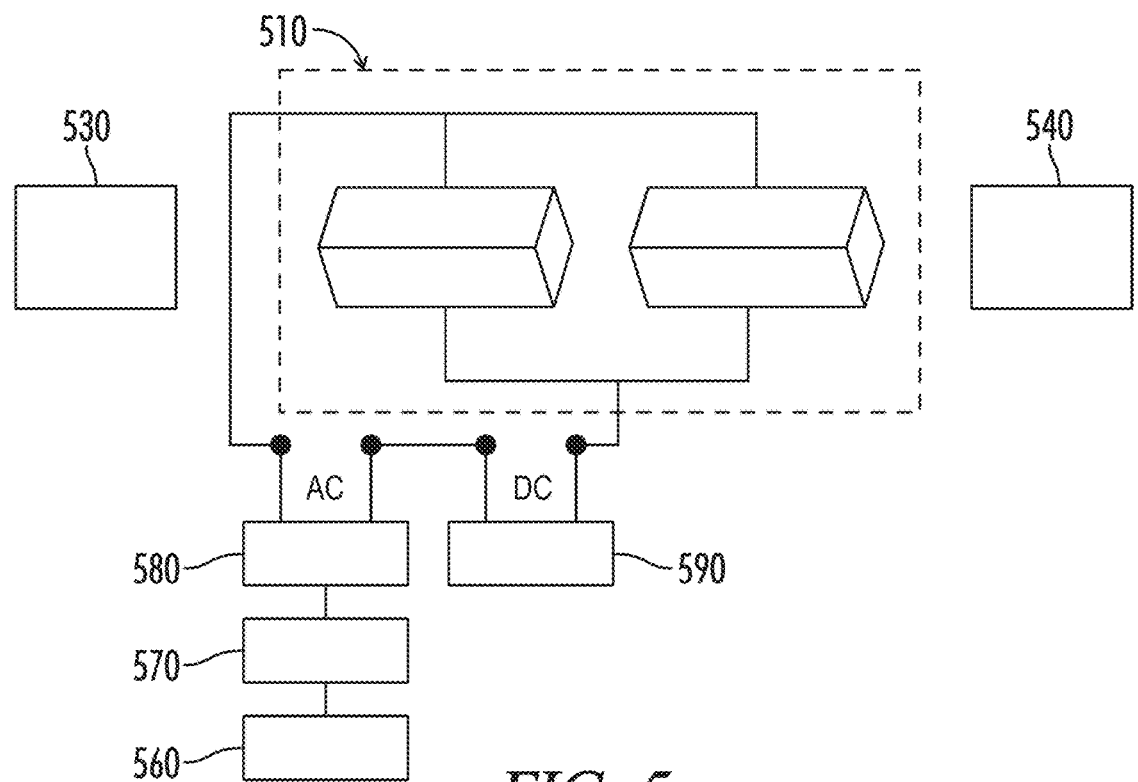
FIG. 5 shows an EOM amplitude modulation assembly according to an embodiment.

FIG. 5 shows a setup of the modulator according to an embodiment. Similar to the setup of FIG. 1, the EOM 510 is placed between two polarizers 530, 540. A custom circuit 560 is used to lock to the laser and create a phase locked signal, with the ability to step phase shift that signal, to a RF power amplifier 570 which drives a transformer 580 providing the AC voltage to the EOM. A DC input (offset) 590 is used to adjust the location of the AC signal within the range of the EOM. The AC signal used for this setup is well below the required amplitude for full contrast laser modulation.

Figure 6:
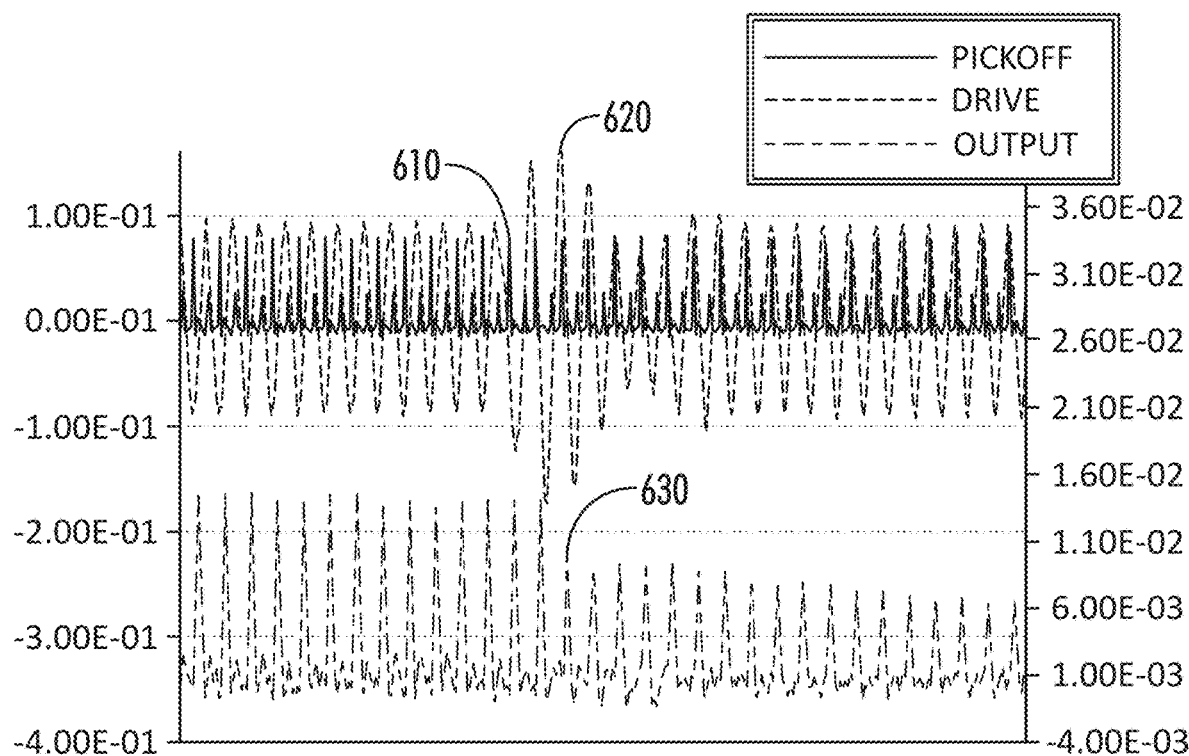
FIG. 6 illustrates the test results of the EOM amplitude modulation assembly according to an embodiment.

Tests were performed using the setup shown in FIG. 5, and the results are shown in FIG. 6. The waveform 610 shows the pulses from the pickoff before the EOM amplitude modulation assembly. Waveform 620 is the drive waveform, generated by the custom phase sync circuit, sent to the power amplifier. Note the 180 degree phase change halfway through the data set. The waveform 630 is the output detector indicating laser intensity.

This shows that using this method, laser intensity of an ultrafast mode-locked laser can be modulated to arbitrary levels within 2-3 laser pulses on an 80 MHz repetition rate laser. This superior modulation speed is not achieved by any of the existing techniques.

In one embodiment, a sinusoidal waveform, which is representative of the EOM modulation waveform, is expressed as:

$$v_s(t) = V_P \sin(2\pi f t + \varphi),$$

where $V_P$ is the amplitude, or "Peak Amplitude" of the waveform, f is frequency in Hz, and $\varphi$ is the phase in radians. Note that there are other representations of amplitude, for example, $V_{RMS} = V_P/\sqrt{2}$ (Root Mean Square Amplitude) or $V_{Peak-Peak} = 2V_P$ (Peak-to-Peak Amplitude).

A periodic impulse train, which is representative of pulsed lasers, is expressed as:

$$p(t) = \sum_{n=-\infty}^{\infty} \delta(t - nT_s)$$

where $T_s$ is the period of the pulses. This means that laser pulses occur at t=0, t=$T_s$, t=$2T_s$, . . . , etc. Now the phase of the EOM drive sinusoid is relative to this and is defined by $\varphi$. The voltage on the EOM is relevant only at the instant in time when the laser pulse is present in the EOM material (crystal). That means the voltage on the sinusoidal waveform is relevant only at time t=0, t=$T_s$, t=$2T_s$, . . . , etc. The drive voltage is thus the sinusoid equation evaluated at those instants in time, and now looks like a discrete-time sampled signal:

$$v_s(nT_s) = V_P \sin(2\pi f n T_s + \varphi), n=0, 1, 2, \ldots$$

When the sinusoid waveform is frequency locked to the laser, we have f=$1/T_s$=repetition rate of the mode-locked laser. This is the key innovation concept from which the present invention is derived. In some embodiments, this concept may be extended to a drive waveform having a phase-coherent pulsed waveform at a frequency equal to the repetition rate of the mode-locked laser, as well as to drive waveform having a phase-coherent sinusoidal waveform at a frequency equal to $1/(2T_s)$, etc.

Figure 7:
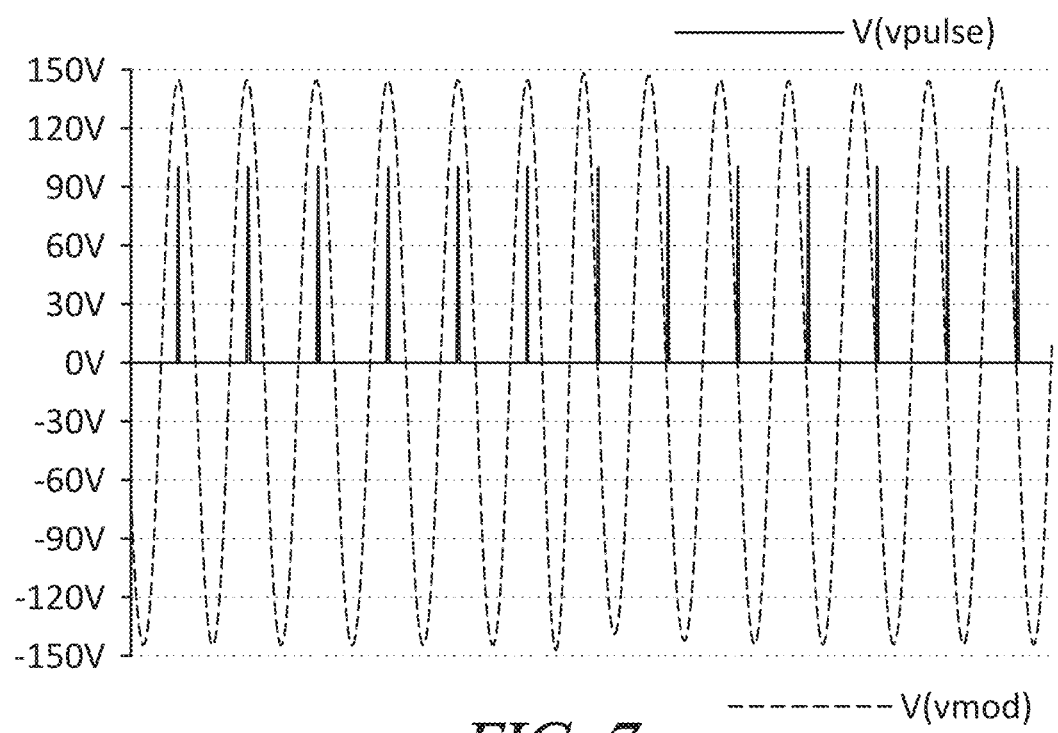
FIG. 7 shows a waveform where a phase shift of 90° is used to shift the drive waveform relative to the laser pulse according to an embodiment.

FIG. 7 shows a waveform where a phase shift of 90° is used to shift the drive waveform relative to the laser pulse, and thus change the voltage on the EOM at the instant the pulse arrives such that the voltage on the EOM changes from $V_P$ to 0.

Note that shifting the phase another 90° (for a total of 180°) will change the voltage to $-V_P$, doubling the voltage range available to drive the EOM.

Figure 8:
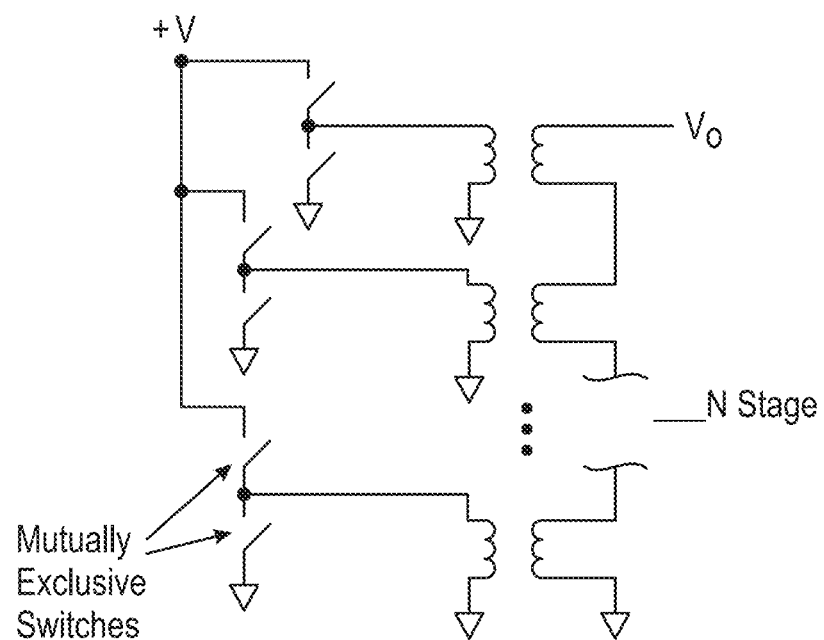
FIG. 8 is a schematic circuit diagram of the series of connected pulse generating stages according to an embodiment.

In one embodiment, a discrete number of pulse amplitudes are generated by a series of connected pulse generating stages. FIG. 8 is a schematic circuit diagram of the series of connected pulse generating stages according to an embodiment.

When a DC bias ($V_{DC\ BIAS}$) is applied, the drive waveform is expressed as:

$$v_s(nT_s) = V_P \sin(2\pi f n T_s + \varphi) + V_{DC\ BIAS}, n=0,1, 2, \ldots$$

Figure 9:
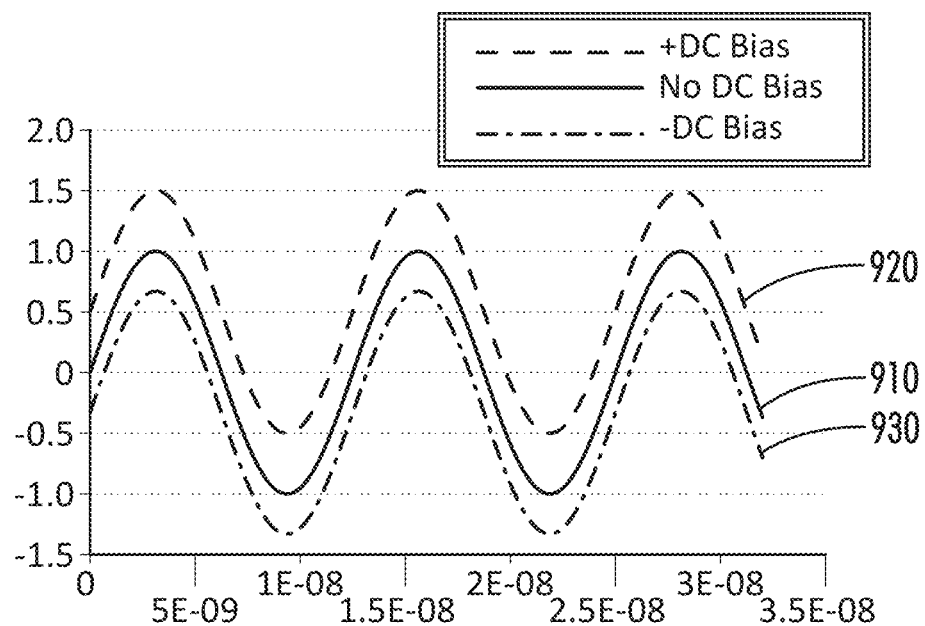
FIG. 9 shows the waveforms with various DC bias according to an embodiment.
Figure 10:
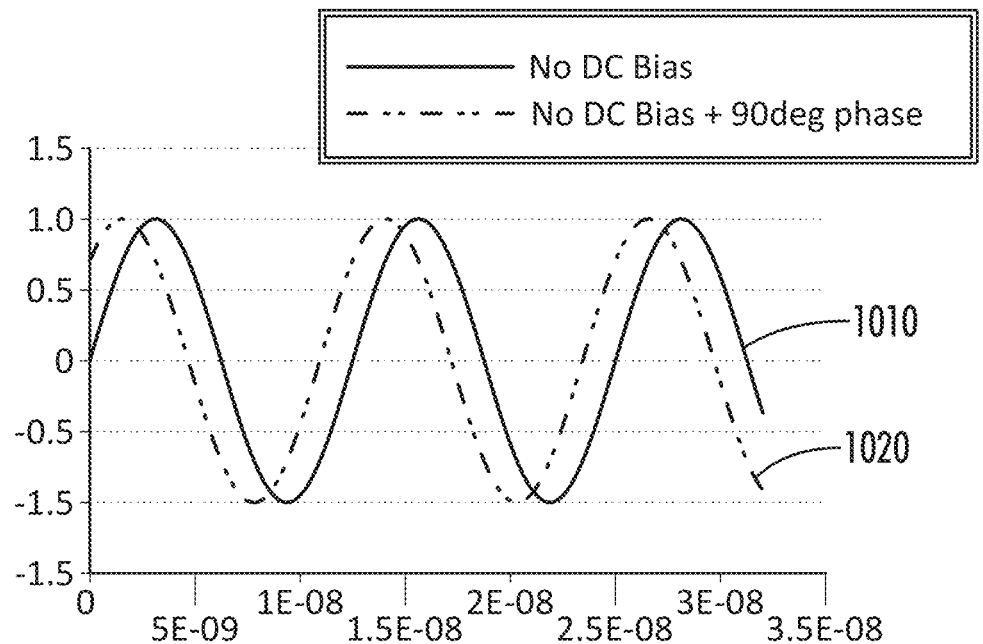
FIG. 10 shows the waveforms with and without phase shift according to an embodiment.

FIG. 9 shows the waveforms with: (1) no DC bias 910, (2) +DC bias 920 and (3) −DC bias 930 is applied. FIG. 10 shows the cases where (1) no DC bias is applied 1010 and (2) no DC bias is applied with +90 degrees phase shift 1020.

In one embodiment, a DC bias is applied such that the waveform is centered with symmetrical positive and negative voltages having substantially equal EOM optical phase shift.

In the case where the drive waveform has a phase-coherent sinusoidal waveform at a frequency equal to half of a repetition rate of the mode-locked laser, the output pulse train would have a repetition rate equal to half of a repetition rate of the mode-locked laser. For example, an ultrafast mode-locked laser having an 80 MHz repetition rate laser would output a pulse train of 40 MHz based on the EOM configured in the embodiments above. That is, the drive waveform has a phase-coherent sinusoidal waveform at a frequency equal to $1/(2T_s)$. The drive voltage now looks like a discrete-time sampled signal:

$$v_s(nT_s) = V_P \sin(n\pi + \varphi), n=0, 1, 2, \ldots$$

Thus, the even pulses would subject to the drive voltage=$V_P \sin(\varphi)$, n=0, 2, 4, . . . , and the odd pulses would subject to the drive voltage=$-V_P \sin(\varphi)$, n=1, 3, 5, . . . . For a phase shift of 90°, we have an alternating drive voltage of $\pm V_P$.

Figure 11:
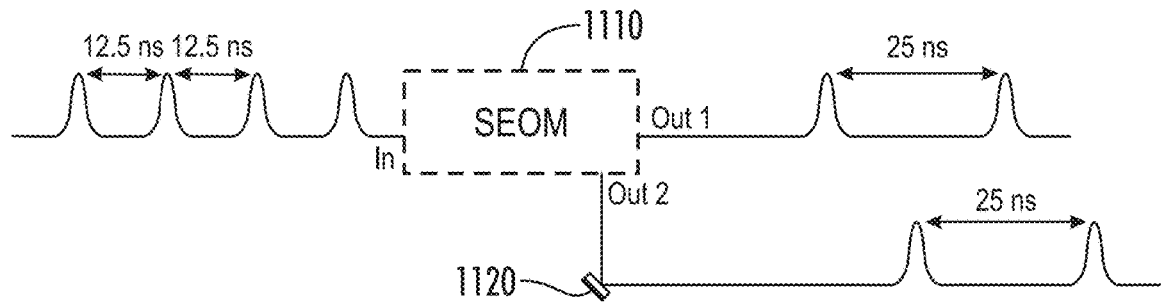
FIG. 11 shows the pulse trains generated by an EOM amplitude modulation assembly according to an embodiment.

In one embodiment, a resonant driver that is phase synchronized to a femtosecond or picosecond pulsed laser is used for driving an EOM. The resonant driver is run with a resonant frequency equal to half the repetition rate of the laser and phase align it so the pulses arrive at either a minimum or maximum of the electric field oscillation, as discussed in the previous paragraph. In one embodiment, the pulses subject to the maximum of the electric field exit through the output polarizer. On the output polarizer, instead of dumping the pulses subject to the minimum of the electric field ("low" pulses), these pulses are diverted using a polarizing beam splitter (PBS) to a second path. This creates two pulse trains that are each half the repetition rate of the input laser with the full peak power per pulse. For example, as shown in FIG. 11, 12.5 ns interval pulses generated by an 80 MHz laser are modulated by the Synchronous EOM (SEOM) 1110 driven by a 40 MHz waveform into two pulse trains, each having a pulse interval of 25 ns. The mirror 1120 is used to direct the second output to a desired direction, which may be the same or different direction from that of the first output.

Figure 12:
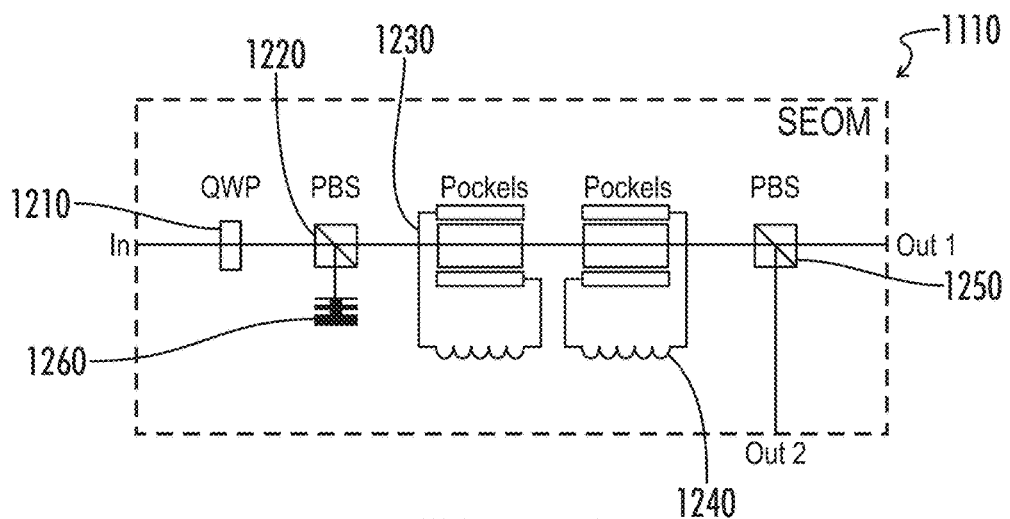
FIG. 12 shows a schematic diagram of an EOM amplitude modulation assembly according to an embodiment.

FIG. 12 is a detail schematic diagram of the SEOM 1110 according to an embodiment. A quarter wave plate 1210 and a first PBS or polarizer 1220 configured to receive an input from a femtosecond or picosecond pulsed laser to provide circularly polarized laser pulses into the electro-optic modulator (such as a Pockels cell) 1230. If the laser pulses are reflected the PBS 1220, they are directed into a sink 1260. The electro-optic modulator 1230 is driven by a waveform driver 1240. The modulated output from the electro-optic modulator is split by the second PBS 1250 into output 1 and output 2 according to their respective polarization states.

In one embodiment, similar drive and pulse splitting configurations could be used with an acousto-optic modulator (AOM) in place of the EOM.

An acousto-optic modulator (AOM), also called a Bragg cell, uses the acousto-optic effect to diffract and shift the frequency of light using sound waves (usually at radio-frequency). They are used in lasers for Q-switching, telecommunications for signal modulation, and in spectroscopy for frequency control. A piezoelectric transducer is attached to a material such as glass. An oscillating electric signal drives the transducer to vibrate, which creates sound waves in the material. These can be thought of as moving periodic planes of expansion and compression that change the index of refraction. Incoming light scatters (see Brillouin scattering) off the resulting periodic index modulation and interference occurs similar to Bragg diffraction. The interaction can be thought of as a three-wave mixing process resulting in Sum-frequency generation or Difference-frequency generation between phonons and photons.

Figure 13:
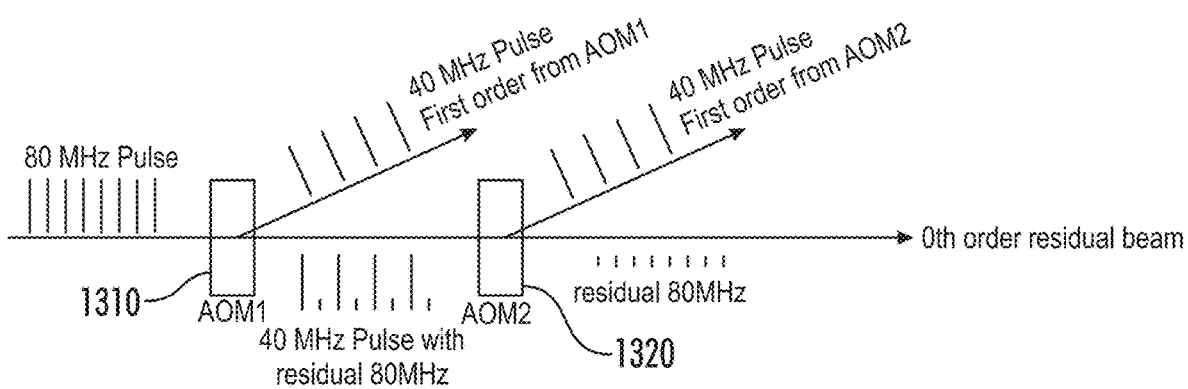
FIG. 13 shows an AOM amplitude modulation assembly according to an embodiment.

FIG. 13 is an illustrative example of using AOM in an ultrafast mode-locked laser arrangement according to an embodiment. A laser source generates a pulse train having a repetition rate (e.g. 80 MHz) and the pulses are diffracted by the first AOM 1310 when the AOM is driven by a phase-coherent sinusoidal waveform at a frequency equal to half of the repetition rate of the mode-locked laser source. In this example, a pulse train having a repetition rate of 40 MHz is output in the direction of the first order diffraction of the first AOM. In the un-diffracted (zero order) direction of the first AOM, a pulse train having a repetition rate of 40 MHz and a residual 80 MHz pulse train arrive at a second AOM 1320. The second AOM 1320 is driven by a phase-coherent sinusoidal waveform at a frequency equal to half of the repetition rate of the mode-locked laser source. Thus, another pulse training having a repetition rate of 40 MHz is in the direction of the first order diffraction of the second AOM, and the residual 80 MHz pulse train is output from the un-diffracted (zero order) direction of the second AOM. The phases of the drive waveform in the first and second AOMs are respectively synchronized to the odd and even pulses of the pulse train from the mode-locked laser. This arrangement results in two pulse trains, each having a repetition rate that is half of the repetition rate of the mode-locked laser source.

An example application of the ultrafast mode-locked laser according to one embodiment is using an 80 MHz Ti:Sapphire femtosecond laser input to create two 40 MHz laser paths that can be focused to different locations within a sample in a 2 Photon Imaging system. De-multiplexing the resulting signal can provide images at two separate locations on the sample with no loss of laser peak power (required for deep imaging) or reduction in framerate.

Another example application of the ultrafast mode-locked laser according to one embodiment is using the two 40 MHz pulses to excite the sample (again in a 2 Photon imaging system) with pulses of two different intensities. De-multiplexing and choosing the appropriate sample based on detection path saturation can provide a final image with 2× the dynamic range of a single intensity pulse train.

Figure 14:
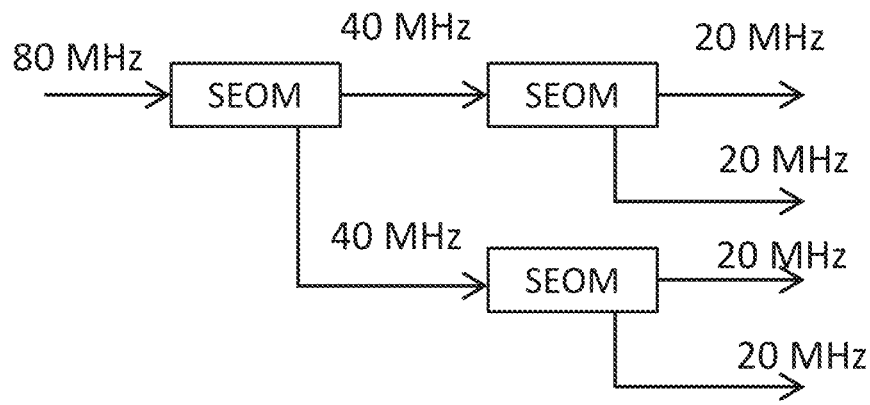
FIG. 14 shows a multi-stage SEOM configuration according to an embodiment.
Figure 15:
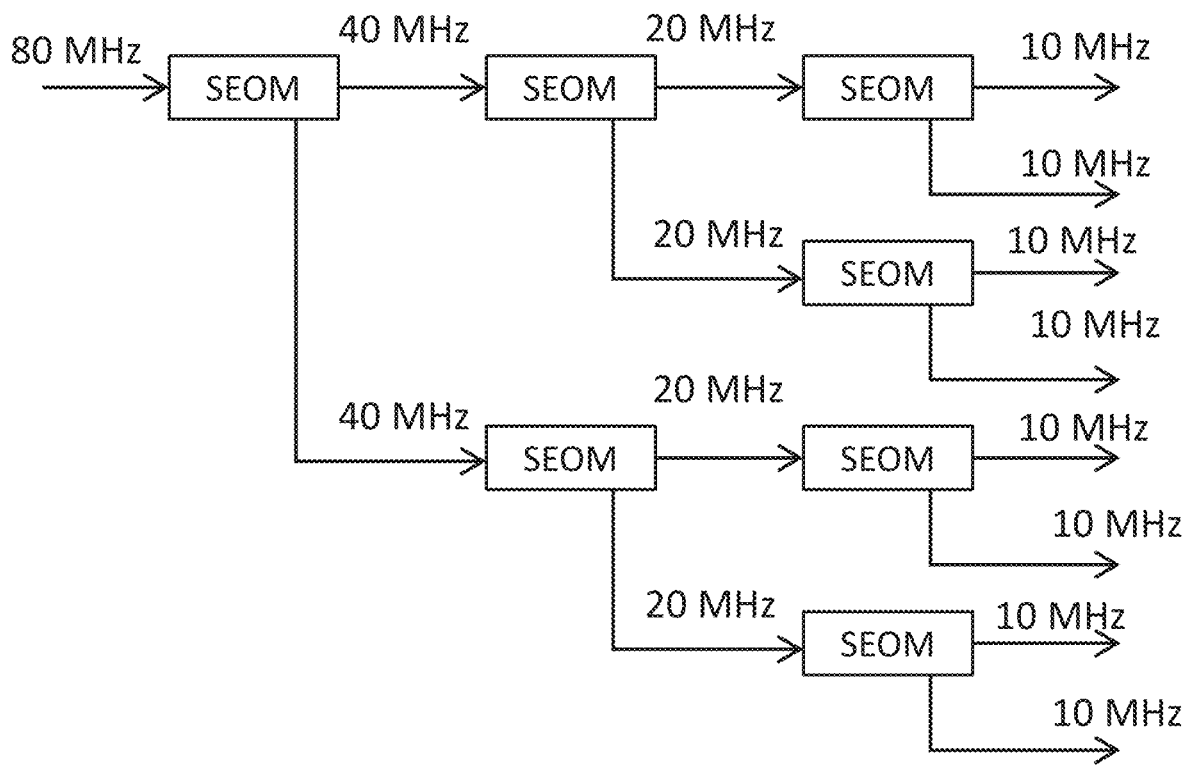
FIG. 15 shows a multi-stage SEOM configuration according to another embodiment.

Both of these example applications can be modified to a power of 2 increase by using more of these Synchronous EOM (SEOM) devices. As shown in FIG. 14, from an 80 MHz source, 3 SEOMs could be used to create 4 pulse trains with 20 MHz repetition rate, again with no loss of peak power in the laser pulses. This peak power is very important to deep imaging in 2 Photon systems. Extending to 7 SEOMs could give 8 trains at 10 MHz, as shown in FIG. 15. In general, to generate $2^n$ pulse trains having a repetition rate equal to $1/2^n$ of the repetition rate of the mode-locked laser source, n being an integer, the mode-locked laser may have $2^n-1$ SEOMs arranged into n stages, with the $k^{th}$ stage containing $2^{(k-1)}$ SEOMs, k=1 to n. The outputs of the SEOMs in the $k^{th}$ stage being fed to the SEOM of the $(k+1)^{th}$ stage. Each of the SEOMs in the $k^{th}$ stage are driven by a phase-coherent sinusoidal waveform at a frequency equal to ½ the repetition rate of the pulse train entering into the stage. The phases of the drive waveform in the SEOMs are synchronized to the respective pulses in the pulse train from the mode-locked laser.

Figure 16:
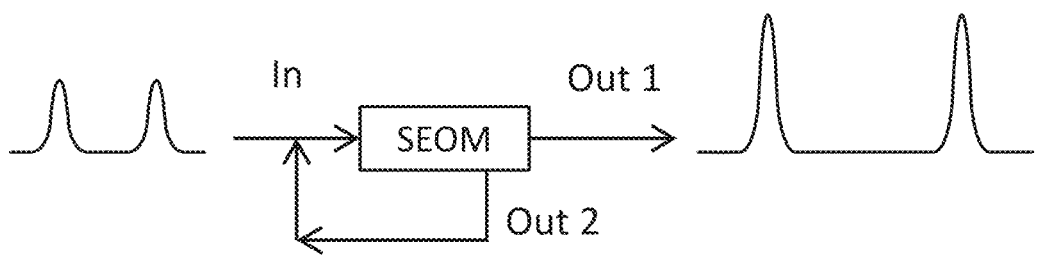
FIG. 16 shows SEOM with feedback loop according to an embodiment.

In one embodiment, where peak power higher than a single pulse is desired, the pulses on one path could be looped back into the input of the SEOM with high resolution temporal alignment so the peak power of the aligned pulses adds, as shown in FIG. 16. The delay of the loop back path is configured to cause a pulse in the second pulse train to coincide with the arrival of the next pulse in the pulse train generated by the mode-locked laser source.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:
1. An ultrafast mode-locked laser comprising:
a mode-locked laser source configured to output laser pulses having a repetition rate;
a synchronous electro-optic modulator (SEOM), comprising:
a half wave plate;
a first polarizing beam splitter or polarizer;
an electro-optic modulator (EOM);
circuitry configured to drive the SEOM with a drive waveform, the drive waveform being a phase-coherent sinusoidal waveform at a frequency equal to half of the repetition rate of the mode-locked laser source; and a second polarizing beam splitter;

wherein the SEOM is arranged to direct the laser pulses from the laser source through the half wave plate, the first polarizing beam splitter, the EOM, and then to the second polarizing beam splitter;

wherein the second polarizing beam splitter is configured to split the light pulses from the EOM into a first pulse train in a first direction having a first polarization state and a second pulse train in a second direction having a second polarization state;

wherein the ultrafast mode-locked laser further comprises one or more optical elements configured to feed the second pulse train back to the SEOM.

2. The ultrafast mode-locked laser of claim 1, the SEOM is configured to generate a phase modulated output.

3. The ultrafast mode-locked laser of claim 1, the SEOM is configured to generate an amplitude modulated output.

4. The ultrafast mode-locked laser of claim 1, wherein the SEOM comprises a Pockels cell.

5. The ultrafast mode-locked laser of claim 1, further comprising a loop back path configured to direct the second pulse train back into an input of the SEOM;

wherein a delay of the loop back path is configured to cause a pulse in the second pulse train to coincide with the arrival of the next pulse in the pulse train generated by the mode-locked laser source.

6. An ultrafast mode-locked laser comprising:

a mode-locked laser source configured to output a laser pulse train having a repetition rate;

a first acousto-optic modulator (AOM);

a second AOM;

circuitry configured to drive the first AOM with a first drive waveform and to drive the second AOM with a second drive waveform, the first and second drive waveforms being phase-coherent sinusoidal waveforms at a frequency equal to half of the repetition rate of the mode-locked laser source, such that the first AOM diffracts odd pulses in the laser pulse train to a first direction and the second AOM diffracts even pulses in the laser pulse train to a second direction.

7. An ultrafast mode-locked laser comprising:

a mode-locked laser source configured to output laser pulses having a repetition rate;

$2^n-1$ synchronous electro-optic modulators (SEOMs) arranged into n stages, n being an integer greater than 1;

for k=1 to n, the $k^{th}$ stage comprises $2^{(k-1)}$ SEOMs, outputs of the SEOMs in the $k^{th}$ stage being fed to the SEOM of the $(k+1)^{th}$ stage, each of the SEOMs in the $k^{th}$ stage being driven with a phase-coherent sinusoidal waveform at a frequency equal to ½ the repetition rate of the pulse train entering into the stage;

wherein each of the SEOM comprises:

a half wave plate;

a first polarizing beam splitter or polarizer;

an electro-optic modulator (EOM);

circuitry configured to drive the SEOM with a drive waveform; and a second polarizing beam splitter;

wherein the SEOM is arranged to direct laser pulses from an input of the SEOM through the half wave plate, the first polarizing beam splitter, the EOM, and then to the second polarizing beam splitter;

wherein the second polarizing beam splitter is configured to split the light pulses from the EOM into a first output pulse train in a first direction having a first polarization state and a second output pulse train in a second direction having a second polarization state.

* * * * *